United States Patent [19]
Wilson

[11] Patent Number: 5,636,788
[45] Date of Patent: Jun. 10, 1997

[54] MICRO-VOLUME FLUID INJECTOR

[75] Inventor: Anthony D. Wilson, Glendora, Calif.

[73] Assignee: City of Hope, Duarte, Calif.

[21] Appl. No.: 549,678

[22] PCT Filed: Apr. 1, 1994

[86] PCT No.: PCT/US94/03630

§ 371 Date: Nov. 9, 1995

§ 102(e) Date: Nov. 9, 1995

[87] PCT Pub. No.: WO95/26830

PCT Pub. Date: Oct. 12, 1995

[51] Int. Cl.[6] .................................................. B05B 3/14
[52] U.S. Cl. ......................................................... 239/102.2
[58] Field of Search ........................... 239/4, 102.2, 102.1; 310/328

[56] References Cited

U.S. PATENT DOCUMENTS

| | | | |
|---|---|---|---|
| 4,533,082 | 8/1985 | Maehara et al. | 239/102.2 |
| 4,702,418 | 10/1987 | Carter et al. | 239/102.2 |
| 4,726,524 | 2/1988 | Ishikawa et al. | 239/102.2 |
| 5,199,641 | 4/1993 | Holm et al. | 239/102.2 |

FOREIGN PATENT DOCUMENTS

| | | | |
|---|---|---|---|
| 88523 | 5/1983 | Japan | 239/102.2 |
| 48501 | 1/1985 | Japan | 239/102.2 |

*Primary Examiner*—Kevin Weldon
*Attorney, Agent, or Firm*—Rothwell, Figg, Ernst & Kurz

[57] ABSTRACT

A micro-volume fluid injector in which the fluid does not contact the piezoelectric disk and is easy to make in very small sizes. A piezoelectric disk is removably secured to the plunger so as to overlie the diaphragm. An upper housing is secured to the upper surface of the intermediate housing sandwiching type disc so that when energized the central portion along with the diaphragm and plunger moves away from the orifice to permit fluid flow therethrough. The plunger is disposed within the orifice and close to the exterior portion of the orifice so that minimal space is provided for undesirable accumulation of fluid.

20 Claims, 5 Drawing Sheets

MICRO-VOLUME FLUID INJECTOR

BACKGROUND OF THE INVENTION

1. Field of the Invention

The present invention relates generally to apparatus for injecting fluids and, more particularly, to apparatus for injecting micro-volumes of fluid.

2. Description of Relevant Art

Injectors for accurately delivering minute quantities of fluids are known in the art. Such injectors may include a piezoelectric valve for precisely and controllably delivering the fluid from a fluid supply to the injector outlet via an inert gas environment.

Prior art piezoelectric valves include a piezoelectric member which typically is spring-biased or loaded so as to position an orifice seal (which is carried by the piezoelectric member) against the outlet orifice of the valve. The piezoelectric member serves as the drive which operates the valve to inject the fluid. Upon the application of electrical current, the piezoelectric member and attached seal move away from the orifice which permits fluid to exit the valve outlet orifice.

A major drawback of conventional piezoelectric valves is that the operational components thereof are contained in a completely enclosed housing and, consequently, cannot easily be accessed. This creates problems because such conventional valves often require adjustment or servicing of some type. In short, prior art piezoelectric valves do not permit sufficient access to the internal components. Moreover, the piezoelectric member is disposed within the fluid pathway, i.e., the fluid directly contacts the piezoelectric member. This may have possible adverse effects on the piezoelectric member and limit the operational life thereof. In view of this, the selection of suitable piezoelectric members also may be limited.

In addition, conventional piezoelectric valves typically must be pressurized to operate and, further, have a limited range of operation, i.e., the volumes of fluid the valves are capable of injecting are limited. Further, known piezoelectric valves are somewhat bulky which limits the number of applications in which the valves may be used. Stated otherwise, such conventional valves cannot be used in injector assemblies having minimal space for disposition of the piezoelectric valve.

Accordingly, there is a need in the art for a piezoelectric valve that is capable of injecting micro-volumes of fluid in a very precise and controlled manner, provides easy access to the internal components of the valve for servicing, replacement, etc., can be used with a wide range of fluids, e.g., either non-caustic chemicals or caustic chemicals, and has a minimal overall size to permit use in reduced size applications.

SUMMARY OF THE INVENTION

The present invention provides a fluid injector for precise, highly controlled and repeatable delivery of micro-volumes (i.e., minute volumes) of fluids. The fluid injector may be used to deliver fluids to an area or surface of interest, or the injector may be combined with or incorporated into a tubing connector to control the flow of fluid through the associated tubing.

The micro-volume fluid injector includes a base member having a conically-shaped recess extending from a first upper surface thereof, and an outlet orifice adjacent a second lower surface thereof. The first and second surfaces are disposed on opposite sides of the base member, and the conically-shaped recess is in communication with the orifice such that fluid may flow through the base member and out of the orifice.

The injector includes a diaphragm member positioned above the base member which diaphragm includes a plunger that extends downward into the conically-shaped recess. The plunger preferably is conically-shaped so as to substantially mate with the recess in the base member while providing an annular clearance between the respective members for the passage of fluid to the outlet orifice.

An intermediate housing member is secured to the base member over the upper surface thereof so as to be substantially coextensive with the diaphragm. A fluid flow path passes downward through the intermediate housing member and between the latter and the base member. The flow path communicates with the conically-shaped recess in the base member to direct fluid therethrough and out of the orifice as described above.

A piezoelectric disk is removably secured to the plunger so as to overlie the diaphragm. An upper housing member is secured to the upper surface of the intermediate housing member and has a portion that overlies the periphery of the piezoelectric disk so as to sandwich said disk periphery between the upper housing member and the intermediate housing member. Thus, when electric current is supplied to the disk, the central portion thereof, along with the diaphragm and plunger, moves away from the orifice in the base member to permit fluid flow therethrough.

The micro-volume fluid injector of the present invention contains fewer components than prior art injectors and, in addition, is much more suitable to be manufactured in a wide range of sizes. As such, the injector can be scaled to very small sizes so as to permit use in applications having minimal space for receiving the injector.

Another significant feature of the present injector is that the fluid does not contact the piezoelectric disk at any time and, therefore, the disk is not susceptible to possible adverse effects from the fluid which may be, e.g., a caustic or toxic fluid.

A further significant feature of the present injector is that a near zero dead volume is maintained at the orifice due to the self-sealing nature of the injector, i.e., due to the forward end of the plunger being disposed within the orifice and closely adjacent the exterior portion of the orifice when in the closed or sealed position. This results in a very minimal space in which fluid may accumulate within the injector and maintains a controlled near zero dead volume.

In addition to the piezoelectric disk that drives the diaphragm and plunger, external gas pressure may be applied as an added driving force to give the injector an even wider range of control, or to provide the injector with an override capability.

BRIEF DESCRIPTION OF THE DRAWINGS

Other objects, features and advantages of the present invention will become more apparent from the following detailed description of a preferred embodiment thereof taken in conjunction with the accompanying drawing figures, wherein.

DETAILED DESCRIPTION OF PREFERRED EMBODIMENTS

Figure 1:
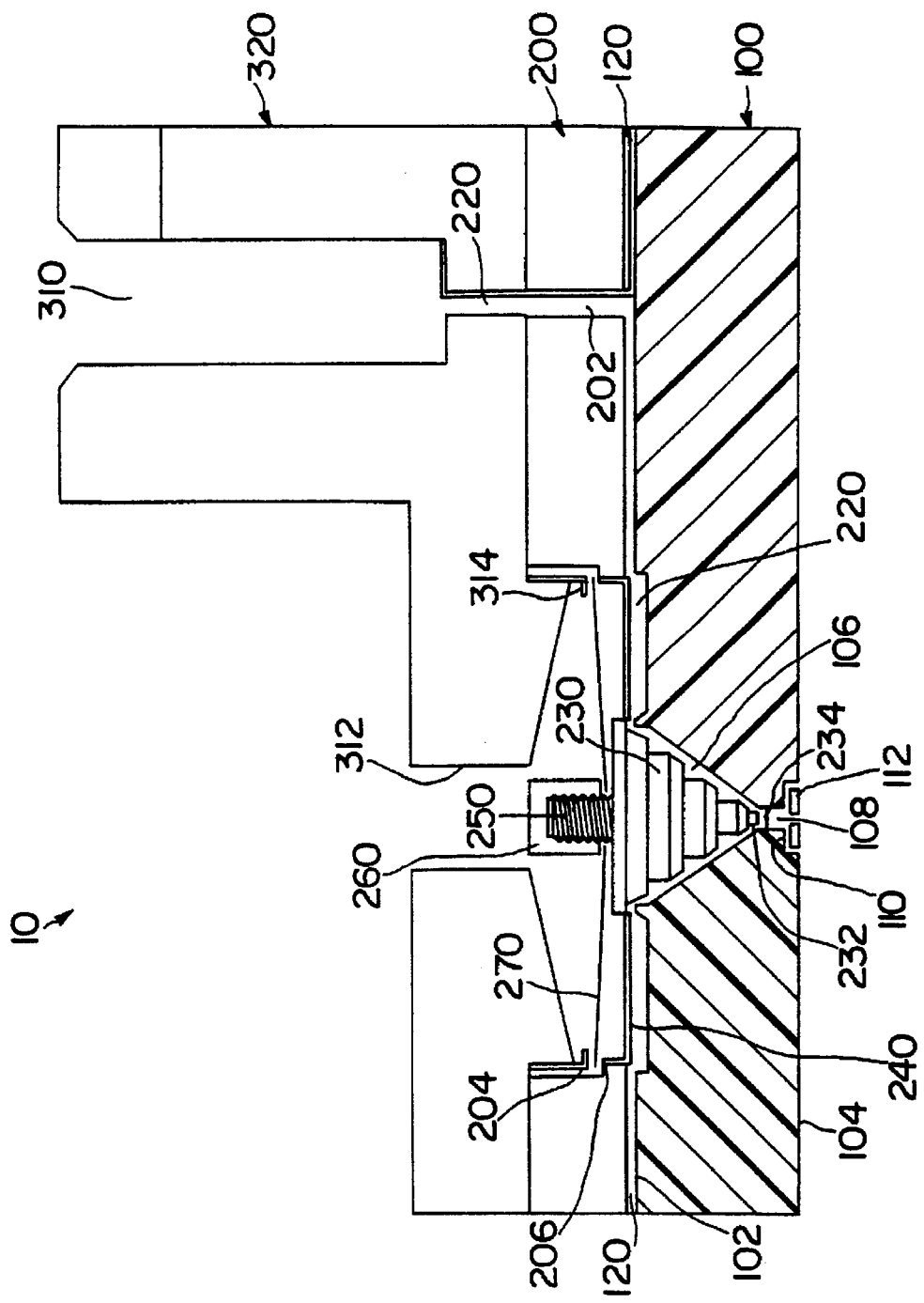
FIG. 1 is a sectional view of an micro-volume fluid injector according to the present invention.
Figure 2A:
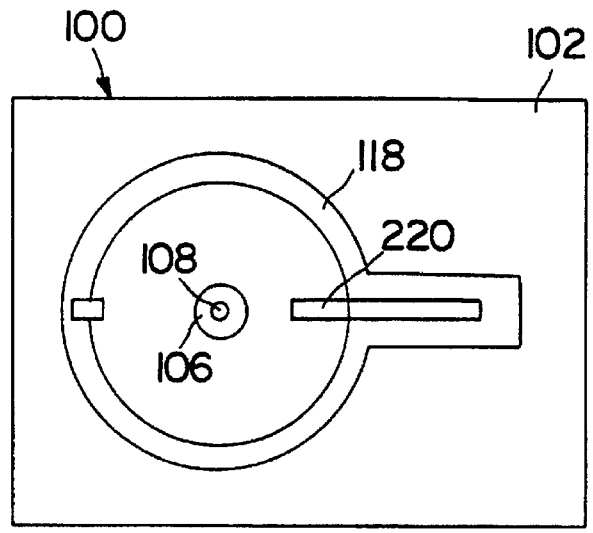
FIGS. 2A–2C, respectively, are an upper plan view, sectional view and lower plan view of the base number shown in FIG. 1.
Figure 2B:
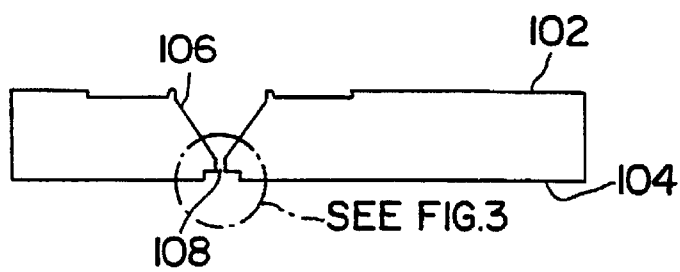
Figure 2C:
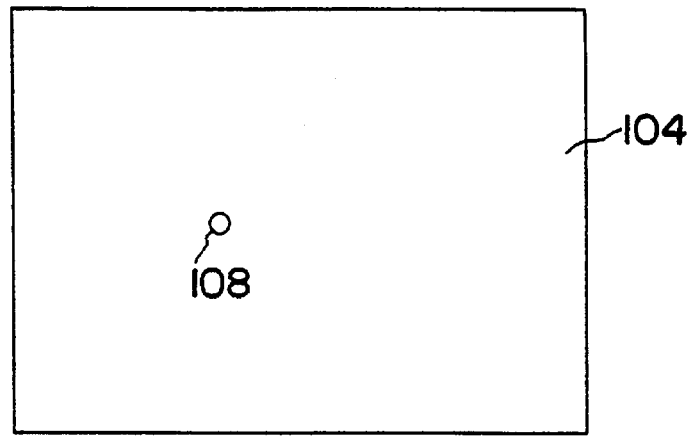
Figure 3:
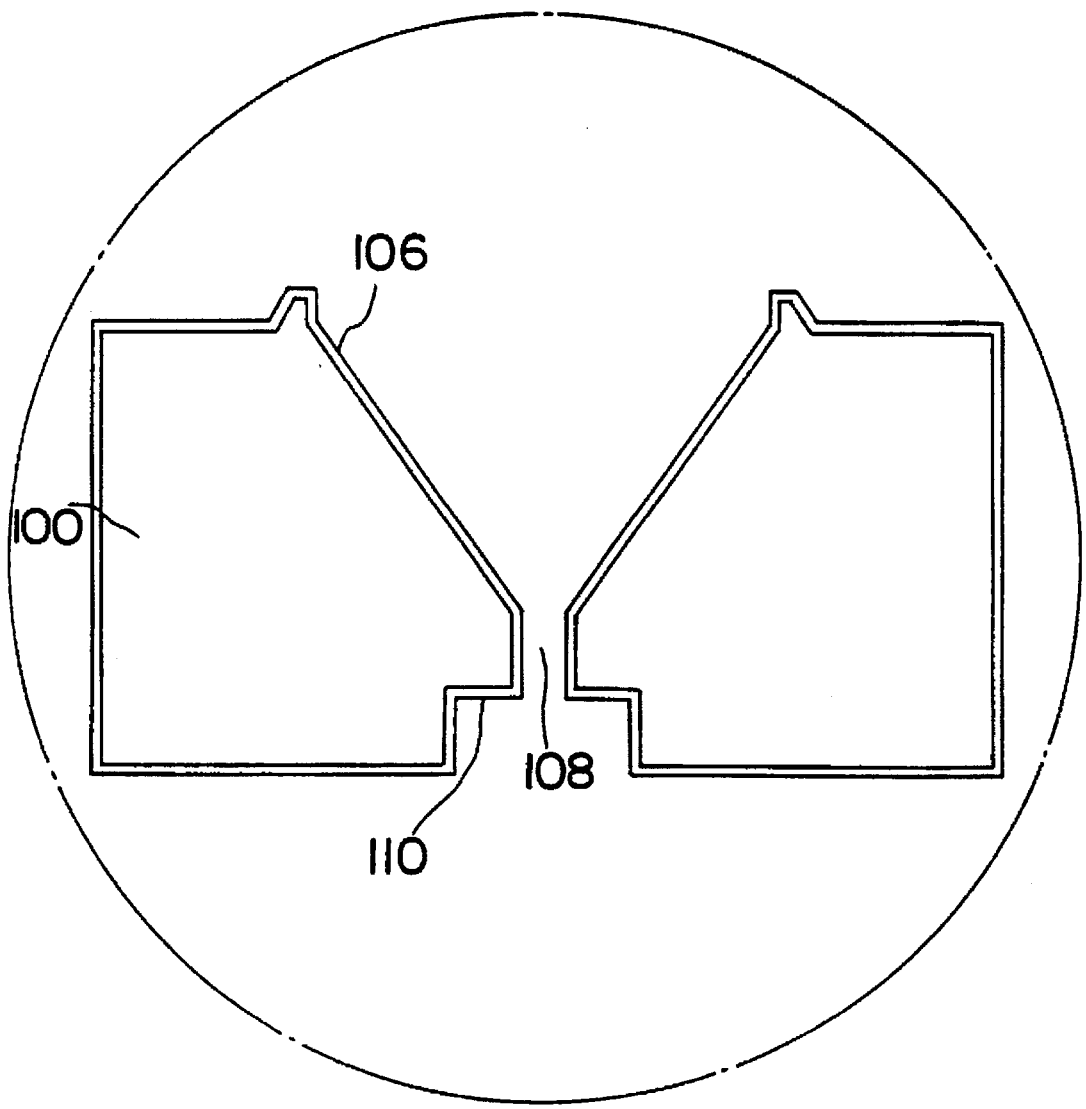
FIG. 3 is an enlarged view depicting the conically-shaped recess of the base member shown in FIGS. 2A–2C.
Figure 4A:
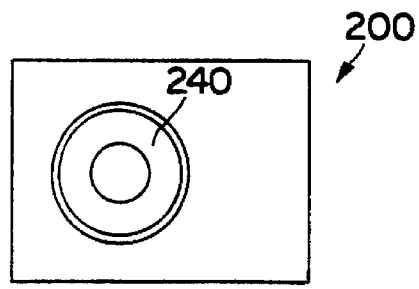
FIGS. 4A–4C, respectively, are an upper plan view, sectional view, and lower plan view of the intermediate housing member shown in FIG. 1.
Figures 1, 4B:
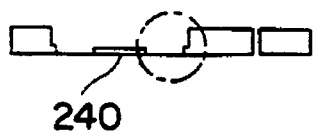
Figures 2, 4B:
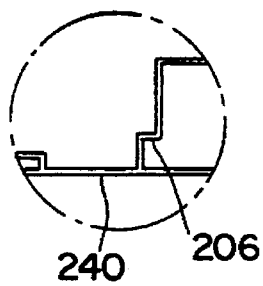
Figure 4C:
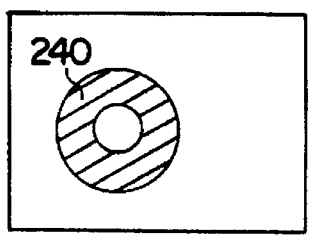
Figure 5A:
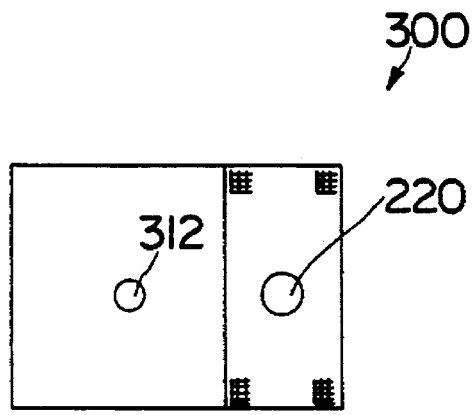
FIGS. 5A–5C, respectively, are an upper plan view, sectional view, and lower plan view of the upper housing member shown in FIG. 1.
Figure 5B:
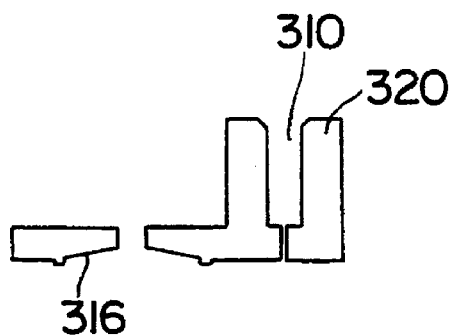
Figure 5C:
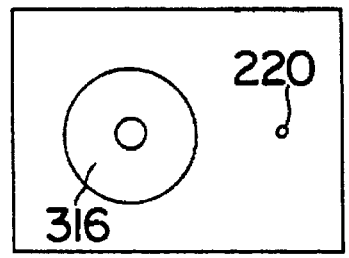

With reference to FIG. 1, a micro-volume fluid injector according to the present invention is indicated generally by reference numeral 10 and includes three main housing portions 100, 200 and 300. The term fluid is used for the sake of convenience and consistency and, of course, as used herein encompasses liquids, gases, or combinations thereof. Base member 100 has a first or upper surface 102 and a lower or second surface 104. An opening extends through the base 100 and is defined by a conically-shaped recess 106 that communicates with an outlet orifice 108. The lower surface 102 of base 100 has a depression 110 formed therein in which is secured, e.g., by being press fit, an orifice frit 112. Orifice frit 112 preferably is made of an inert material and, in a preferred embodiment, comprises sapphire or ruby. Base member 100 also is made of an inert material and, in a preferred embodiment, is machined from a polymer such as polychloraltrifluoroethylene. This polymer is inert to a wide range of chemical substances and, in addition, is relatively easy to machine to the desired configuration. This polymeric material is commercially available and is marketed under the trade name of Kel-S.

A gasket 120 is securely positioned between base member 100 and intermediate housing member 200 for reasons that will be described below. Intermediate housing member 200 preferably is made of the same material as base member 100 and is securely affixed thereto (with gasket 120 therebetween) by any suitable means, e.g., screws, clamps, or any other retaining means. Intermediate housing member 200 has a passage 202 extending longitudinally (vertically in FIG. 1) therethrough which passage, along with space 220 between base 100 and housing member 200, serves as a fluid flow path as will be described below.

Intermediate housing member 200 has an opening 204 formed therein which opening 204 overlies conically-shaped recess 106 of base member 100. Adjacent opening 204 is a flange 206 which serves as a seat for the peripheral edge portion of piezoelectric disk 270 as will be explained below. A diaphragm 240 is secured to intermediate housing member 200 within opening 204. Diaphragm 240 is a thin flexible member and preferably is made of the same material as base member 100 and housing member 200. Securely affixed to diaphragm 240 is a plunger 230 which, as seen in FIG. 1., extends downward into conically-shaped recess 106 of base member 100. In a preferred embodiment, plunger 230 is formed integrally with diaphragm 240 by any suitable process. As such, plunger 230 preferably formed of the same material as diaphragm 240. As stated above, the material is a polymer which is inert to a wide range of chemical substances (as the plunger and diaphragm directly contact the fluid delivered by the injector).

Although not absolutely necessary, plunger 230 preferably is conically-shaped so as to substantially mate with recess 106. In a preferred embodiment, plunger 230 has a stepped configuration as seen in FIG. 1. Accordingly, the clearance between plunger 230 and recess 106 also is stepped, and this clearance provides the fluid flow path as explained below. Plunger 230 has a forward end portion 232 with an orifice seal member 234 attached thereto. Forward end portion 232 of plunger 230 is received within orifice 108 of base member 100 when the plunger is in the closed, at rest position (as in FIG. 1). Thus, when plunger 230 is in the closed position, orifice seal 234 occludes orifice 108 and prevents the flow of fluid therethrough. The fact that the forward portion 232 of plunger 230 is disposed within orifice 108 and closely adjacent lower surface 104 of base member 100 provides a near zero dead volume for fluid to accumulate in and, consequently, be exposed to the conditions exterior to the injector.

Plunger 230 preferably has a post portion 250 for receiving a piezoelectric disk 270 in removable fashion. The piezoelectric disk 270 has a central aperture 236 through which the post 250 extends. In a preferred embodiment, post 250 is threaded and a stainless steel nut 260 is attached thereto to secure the disk 270 to diaphragm 240 and plunger 230. It will, of course, readily be recognized by those skilled in the art that the above-described structure is but one example of a manner in which the piezoelectric disk 270 may be removably secured to the diaphragm 240. Piezoelectric disk 270 is formed of a ceramic material as is known in the art.

Completing the assembly of the micro-volume fluid injector 10 is upper housing member 300. Upper housing member 300 includes an extended portion which forms a fluid reservoir 310, as well as a passage 320 extending therethrough which passage forms a fluid flow path (that communicates, as seen in FIG. 1, with flow path 202 of intermediate housing member 200). Upper housing member 300 also has an opening 312 overlying the diaphragm 240, plunger 230, and piezoelectric disk 270. Opening 312 provides passage into the interior of the injector as seen in FIGS. 1 and 5A–5C. Upper housing member 300 further includes a flange member 314 which engages the peripheral edge of piezoelectric disk 270 and forces same against the aforementioned flange 206 of intermediate housing member 200. Consequently, the peripheral edge of piezoelectric disk 270 is sandwiched between flange 314 and flange 206 and prevented from moving as described below. The underside of upper housing member 300 is recessed at 316 to provide clearance for receiving the piezoelectric disk 270 as seen in the drawing figures.

Upper housing member 300 also preferably is formed of polychloraltrifluoroethylene so as to be inert to a wide range of chemical substances and easily machined. Attachment of upper housing member 300 to intermediate housing member 200 is facilitated by any suitable retaining means as discussed above with respect to the attachment of member 200 to base member 100.

The operation of the micro-volume fluid injector of the present invention now will be described. Upon the application of electrical current to piezoelectric disk 270, (e.g. in the form of a direct voltage waveform on the order of 25 to 400 volts, or complex computer control used to vary same), disk 270 is caused to move upward (as seen in FIG. 1). As the peripheral edge portion of the disk 270 is prevented from moving, the central portion of the disk moves upward. This causes the plunger 230 and diaphragm 240, which are secured to disk 270, to move upward in a direction away from and out of conically-shaped recess 106 which in turn moves forward portion 232 of plunger 230 out of orifice 108. Consequently, fluid contained in reservoir 310 flows through flow passage 220, flow paths 202 and 220, through the clearance between plunger 230 and recess 106, and out of orifice 108.

As stated above, it also is possible to apply external gas pressure to the diaphragm and plunger as an added driving force to give the injector an even wider range of control, or to provide the injector with an override capability.

In one method of operating the injector of the present invention, the plunger 230 is moved up and down the maximum amount permitted by the apparatus, e.g., 15 mils. When the plunger 230 is moved upward fluid is forced to the forward portion 232 thereof, and when the plunger is moved downward the fluid is forced through orifice 108 to the target area.

An additional method of operating the injector moves the plunger 230 in a vibratory fluid shock mode immediately above the orifice 108 which results in a continuous delivery of fluid until sealing is desired (at which point the plunger 230 is moved to its full downward position to seal the orifice 108).

The micro-volume fluid injector of the present invention provides a device which is much less complex than prior art injectors. This permits the present injector to be manufactured in very small sizes for applications in which space for the injector is limited. Further, as noted above, the present injector results in a near zero dead volume at the outlet orifice. Still further, the piezoelectric disk is totally isolated from the fluid and thus is not susceptible to being adversely affected thereby.

Although the present invention has been described with reference to particular embodiments, it is to be understood that the embodiments are merely illustrative of the application of the principles of the invention. Numerous configurations may be made therewith and other arrangements may be devised without departing from the spirit and scope of the invention.

What is claimed is:

1. An apparatus for injecting micro-volumes of fluid, the apparatus comprising:

a base member having a conically-shaped recess and an outlet orifice in communication with other;

an intermediate housing member secured to the base member and overlying said base member so as to define a fluid flow path between the base member and the intermediate housing member, the fluid flow path communicating with said conically-shaped recess of said base member and extending through said intermediate housing member;

said intermediate housing member including a diaphragm disposed above the conically-shaped recess, and a plunger secured to said diaphragm and extending downwardly therefrom into the conically-shaped recess, the plunger having a portion which is receivable in the orifice of said base member to seal said orifice and prevent fluid flow therethrough;

a piezoelectric disk removably secured to said plunger; and an upper housing member secured to said intermediate housing member and overlying a portion of said piezoelectric disk, the upper housing member including a fluid reservoir which is in communication with the fluid flow path;

whereby upon the application of power to said piezoelectric disk the disk is caused to move upward away from said base member so as to move the plunger out of the orifice of said base member to permit fluid to flow from said reservoir, through the fluid flow path, into said conically-shaped recess and out of said orifice.

2. An apparatus as claimed in claim 1, wherein said plunger is conically-shaped so as to substantially mate with the conically-shaped recess of said base member.

3. An apparatus as claimed in claim 2, wherein said plunger has a stepped configuration along the length thereof.

4. An apparatus as claimed in claim 2, wherein a glass seal member is secured to the forward end of said plunger for sealing the orifice.

5. An apparatus as claimed in claim 1, wherein said upper housing member has means for retaining a peripheral edge portion of the piezoelectric disk so that only a central portion of the disk moves upwardly upon the application of a power source thereto.

6. An apparatus as claimed in claim 5, wherein said retaining means includes flange formed on said upper housing member which flange contacts the peripheral edge portion of the disk.

7. An apparatus as claimed in claim 1, wherein the plunger includes a post member over which the disk is positioned, and a retaining member is positioned over the post member to secure the piezoelectric disk to said plunger.

8. An apparatus as claimed in claim 1, wherein a gasket member is positioned between a peripheral portion of said intermediate housing member and a peripheral portion of said base member, and the fluid flow path is located inward of the gasket member.

9. An apparatus as claimed in claim 1, wherein said plunger is formed integrally with said diaphragm.

10. An apparatus as claimed in claim 1, wherein said base member, intermediate housing member, upper housing member, plunger, and diaphragm are formed of polychloraltrifluoroethylene.

11. An apparatus as claimed in claim 1, wherein said base member has a depression formed therein adjacent said orifice, and a frit member is fixed in the depression, and said orifice is located between said frit and said conically-shaped recess of said base member.

12. An apparatus for injecting micro-volumes of fluid, the apparatus comprising:

a base member having an opening extending therethrough from a first surface of said base member to a second surface of said base member, the opening defining a conically-shaped recess extending from the first surface of the base member, the recess communicating with an orifice defined by said opening, the orifice being located adjacent the second surface of the base member;

an intermediate housing member secured to the base member and overlying the first surface of said base member so as to define a fluid flow path between the base member and the intermediate housing member, the fluid flow path communicating with said conically-shaped recess of said base member and with a pathway extending through said intermediate housing member;

said intermediate housing member including a diaphragm which is disposed above the conically-shaped recess of said base member, and a plunger secured to said diaphragm so as to extend downwardly therefrom into the conically-shaped recess of said base member, the plunger having a forward end portion which is receivable in the orifice of said base member to seal said orifice and prevent fluid flow therethrough;

said plunger having a post member secured centrally thereto and extending upward therefrom away from said base member;

a piezoelectric disk having an aperture formed therein and being removably positioned over and secured to said plunger with the post member passing through said disk aperture; and an upper housing member secured to said intermediate housing member and overlying a portion of said piezoelectric disk, the upper housing member including a fluid reservoir which is in communication with the pathway extending through said intermediate housing member and said base member;

whereby when a power source is applied to said piezoelectric disk, the disk moves upward away from said base member which causes the plunger to move upward with the forward end of said plunger moving out of the orifice of said base member to permit fluid to flow from said reservoir, through the pathway in said intermediate housing member, through the fluid flow path between said intermediate housing member and said base member, and into said conically-shaped recess and out of said orifice.

13. An apparatus as claimed in claim 12, wherein said plunger is conically-shaped so as to substantially mate with the conically-shaped recess of said base member.

14. An apparatus as claimed in claim 13, wherein said plunger has a stepped configuration along the length thereof.

15. An apparatus as claimed in claim 13, wherein a glass seal member is secured to the forward end of said plunger.

16. An apparatus as claimed in claim 12 wherein said upper housing member has means for retaining a peripheral edge portion of the piezoelectric disk so that a central portion of the disk moves upwardly upon the application of a power source thereto.

17. An apparatus as claimed in claim 12, wherein a retaining member is positioned over the post member of the plunger to secure the piezoelectric disk to said plunger.

18. An apparatus as claimed in claim 12, wherein a gasket member is positioned between a peripheral portion of said intermediate housing member and a peripheral portion of said base member, and the fluid flow path is located inward of the gasket member.

19. An apparatus as claimed in claim 12, wherein said plunger is formed integrally with said diaphragm.

20. An apparatus as claimed in claim 12, wherein said base member, intermediate housing member, upper housing member, plunger, and diaphragm are formed of polychloraltrifluoroethylene.

* * * * *